United States Patent Office 3,304,350
Patented Feb. 14, 1967

3,304,350
PREPARATION OF POLYFLUOROALKYL PHOSPHONITRILATES
Ehrenfried H. Kober, Hamden, Henry F. Lederle, North Haven, and Gerhard F. Ottmann, Hamden, Conn., assignors to Olin Mathieson Chemical Corporation, a corporation of Virginia
No Drawing. Filed Apr. 1, 1964, Ser. No. 356,634
7 Claims. (Cl. 260—973)

This invention relates to a method for the preparation of polymeric polyfluoroalkyl phosphonitrilates which are cyclic compounds having the generic formula:

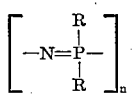

wherein $n$ is a small whole number of at least 3 and up to 7 or higher and R is selected from the group consisting of chlorine and a polyfluoroalkoxy radical of the formula:

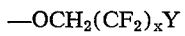

wherein Y is hydrogen or fluorine and $x$ is a whole number of from 1 to 20 and preferably from 1 to 8.

By the process of this invention polymeric polyfluoroalkyl phosphonitrilates can be prepared in high yields and in a highly pure state employing a heterogeneous solvent system. More specifically, the process consists of reacting a phosphonitrilic chloride with polyfluoroalkanols in the presence of an alkali metal hydroxide, preferably, potassium hydroxide, as an acid acceptor in a binary solvent system consisting of water and a water-immiscible aromatic hydrocarbon. With the method of this invention asymmetrically substituted polyfluoroalkyl phosphonitrilates also can be prepared by using a mixture of fluoroalcohols.

The polymeric phosphorus nitrilic halides suitable for the method of this invention have the formula:

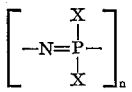

where $n$ is an integer of from 3 to 7 or higher. The corresponding bromine and iodine compounds are also useful. Mixtures of phosphonitrilic chlorides can be employed, if desired. The phosphonitrilic chlorides utilized in the process of this invention as starting materials are cyclic compounds. The structural formulae of the trimeric (I) and tetrameric (II) forms are show below:

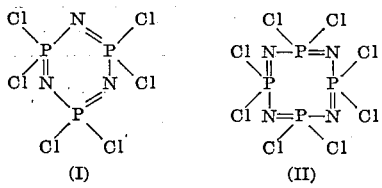

The method of Schenk and Römer, in which phosphorus pentachloride is reacted with ammonium chloride, may be used to prepare the cyclic phosphonitrilic chlorides employed in the process of this invention. In this process, the cyclic trimeric (I) and tetrameric (II) forms are obtained as well as higher molecular weight products.

The $\alpha,\alpha,\omega$-tri-H-polyfluoroalcohols used as starting materials in the process of this invention can be prepared by telomerization of tetrafluoroethylene with methanol:

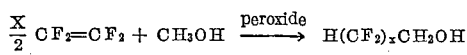

Typical examples of useful polyfluoroalcohols include 1,1,3-tri-H-tetrafluoropropyl alcohol; 1,1,5-tri-H-octafluoropentyl alcohol; 1,1,7-tri-H-dodecafluoroheptyl alcohol; 1,1,9-tri-H-hexadecafluorononyl alcohol; and 1,1,11-tri-H-eicosafluoroundecanyl alcohol, etc.

The 1,1-di-H-polyfluoroalcohols of the formula

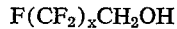

where $x$ is a small whole number of from 1 to 20 can also be employed in the process of this invention. These compounds can be made by reduction of the corresponding acids or their esters. Typical examples of such polyfluoroalcohols include 1,1-di-H-trifluoroethyl alcohol; 1,1-di-H-pentafluoropropyl alcohol; 1,1-di-H-heptafluorobutyl alcohol; 1,1-di-H-pentadecafluorooctyl alcohol, etc.

The polyfluoroalcohols are preferably used in an excess of from about 5 to about 50% (on a molar basis) over the amount necessary to replace all chlorine atoms of the phosphonitrilic chloride starting material.

To obtain the benefits of this invention three critical ingredients must be present—a water-soluble acid acceptor, water, and an aromatic hydrocarbon.

Since the reaction proceeds with the formation of hydrogen chloride, this hydrogen chloride must be bound by a hydrogen chloride acceptor in order to complete the reaction. The hydrogen chloride acceptor employed in this reaction must be soluble only in the aqueous phase of the reaction mixture. Potassium hydroxide is the preferred hydrogen chloride acceptor but the other alkali metal hydroxides, especially sodium hydroxide, may also be used. The alkali metal hydroxide should preferably be present in an amount at least 25% to about 50% in excess (on a molar basis) of the theoretical quantity necessary to neutralize the hydrogen chloride formed.

The amount of water to be used is determined by the quantity of alkali metal hydroxide employed in the reaction. An aqueous solution of alkali metal hydroxide containing from about 10% to about 40% (by weight) may be advantageously employed but the preferred concentration is from about 20% to about 35% by weight.

Aromatic hydrocarbons which may be utilized include, for example, benzene, toluene, xylene, chlorobenzene and the like. Although the aromatic hydrocarbon must be present, it is equally important to confine the quantity of this material to the essential level. It is of advantage to employ for each part by weight of the polyfluoroalcohol about 0.5 to 2.5 parts by weight of aromatic hydrocarbon. An additional amount of the aromatic hydrocarbon may be provided to dissolve the phosphonitrilic chloride employed and to make a saturated solution at room temperature.

The temperature of reaction ranges from approximately 25° C. to approximately 200° C. and preferably from approximately 60° C. to approximately 150° C. The temperature required depends upon the alcohols reacted and the other reaction conditions employed. The time of reaction ranges from approximately 2 hours to approximately 60 hours. The reaction takes place most conveniently at atmospheric pressure, however, subatmospheric pressure as well as pressures up to several atmospheres can be utilized.

A critical condition of this invention is the sequence of addition. Thus, the phosphonitrilic chloride is advantageously added in solution or in form of small lumps to the vigorously stirred emulsion of polyfluoroalcohol, alkali metal hydroxide, water and the aromatic hydrocarbon. The temperature of addition may vary widely but it is most convenient to add the phosphonitrilic chloride to a heated suspension at such a rate that a gentle reflux is maintained.

In the described system, the phosphonitrilic chloride is preferentially soluble in the aromatic hydrocarbon and insoluble in the aqueous phase. The reaction products which are insoluble in the aqueous phase and of limited solubility in the aromatic hydrocarbon may precipitate as a third layer if the amount of hydrocarbon present is insufficient to dissolve the entire product. The reaction product and the aromatic hydrocarbon phase are removed by a simple phase separation. After the organic phase has been washed with water, the solvent and excessive polyfluoroalcohol are recovered for reuse by distillation. The product is then recovered from the reaction mixture by distillation in vacuo.

The products of this invention are useful as fire resistant fluids. They exhibit high chemical and thermal stability, high flash temperatures, high fire points, and high spontaneous ignition temperatures, low pour points and low vapor pressure. The products also exhibit low ASTM viscosity slopes, a high degree of lubricity, low foaming tendency, non-corrosivity toward metals, inertness toward solvents, etc.

The example is illustrative and not limitative.

*Example 1*

A two-liter, three-necked Morton flask, equipped with stirrer, condenser, and dropping funnel, was charged with 56.0 g. of potassium hydroxide and 133 ml. of deionized water. While the solution was vigorously stirred, 1,1,7-tri-H-dodecafluoroheptyl alcohol, 332 g. (1.0 mole) in 332 ml. of toluene was added slightly above room temperature. The mixture was then heated to gentle refluxing for half an hour. Tetrameric phosphonitrilic chloride, 46.4 g. (0.1 mole) in 320 ml. of toluene was then added at such a rate that gentle spontaneous refluxing resulted. Stirring and refluxing were continued for 51 hours.

The cooled product was poured into a separatory funnel where three layers resulted. Bottom and top, containing the organic material were combined and washed with water. After stripping of the solvent, a yield of crude tetrameric bis-1,1,7-tri-H-dodecafluoroheptylphosphonitrilate of 85 percent was obtained. Distillation of the crude product, after 0.5 percent by weight of lime had been added, at 0.5 mm. Hg gave the pure product in better than 60 percent yield based on the refractive index. The fluid was then treated twice with charcoal at 60–70° C. for two hours and filtered through a filter aid in order to remove readily adsorbable trace impurities.

The formula of the product of Example I is shown below:

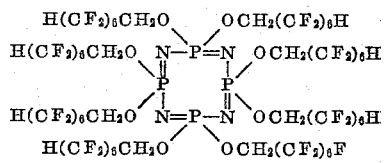

The polyfluoroalkyl phosphonitrilates are low melting or liquid, almost odorless and colorless compounds. In general they are insoluble in water, but miscible or of very good solubility in most common organic solvents. They are not inflammable. They have a remarkable thermal stability and can be distilled under atmospheric pressure without decomposition. By proper choice of the polymeric phosphonitrilic halide and the fluorinated alcohol products with boiling points ranging from 250° C. to 500° C. and more can be obtained. The polyfluoroalkyl phosphonitrilates are also unusually chemical resistant, especially against oxidation, even to the extent that the commonly adopted methods of organic elementary analysis by cmbustion over cupric oxide in a stream of oxygen do not completely destroy these new compounds. Contrary to ordinary esters, the new compounds are extremely difficult to hydrolyze. Refluxing with concentrated nitric acid or concentrated aqueous alkali hydroxides does not attack these products to any measurable amount. They even can be distilled at atmospheric pressure over sodium metal without decomposition. These remarkable properties make these polyfluoroalkyl phosphonitrilates valuable for many industrial applications. They can be used as heat transfer media, high temperature lubricants, transformer oils, fire-retardant plasticizers and hydraulic fluids.

What is claimed is:

1. A method for the preparation of a polyfluoroalkyl phosphonitrilate which comprises reacting a phosphonitrilic chloride of the formula:

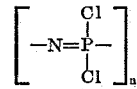

wherein $n$ is an integer of from 3 to 7 inclusive with a polyfluoroalcohol of the formula:

$$Y(CF_2)_xCH_2OH$$

wherein Y is selected from the group consisting of hydrogen and fluorine, $x$ is a small whole number of from 1 to 20 in a water-aromatic hydrocarbon medium and in the presence of a water-soluble acid acceptor.

2. The process of claim 1 wherein the aromatic hydrocarbon is toluene.

3. The process of claim 1 wherein the acid acceptor is potassium hydroxide.

4. The process of claim 1 wherein the polyfluoroalcohol is 1,1,7-tri-H-dodecafluoroheptyl alcohol.

5. The process of claim 1 wherein the temperature of the reaction is from about 25° C. to about 200° C.

6. The process of claim 1 wherein the phosphonitrilic chloride is tetrameric phosphonitrilic chloride.

7. The method for the preparation of a polyfluoroalkyl phosphonitrilate which comprises reacting 1,1,7-tri-H-dodecafluoroheptyl alcohol with tetrameric phosphonitrilic chloride in a water-toluene medium and in the presence of potassium hydroxide.

References Cited by the Examiner

UNITED STATES PATENTS

| | | | |
|---|---|---|---|
| 2,754,317 | 7/1956 | Conly | 260—461 |
| 2,876,247 | 3/1959 | Ratz et al. | 260—461 |
| 2,898,364 | 8/1959 | Conly | 260—461 |

CHARLES B. PARKER, *Primary Examiner.*

F. M. SIKORA, *Assistant Examiner.*